(12) United States Patent
Kwon et al.

(10) Patent No.: US 9,970,690 B2
(45) Date of Patent: May 15, 2018

(54) MAGNETIC REFRIGERATOR AND DEVICE INCLUDING THE SAME

(71) Applicant: Samsung Electronics Co., Ltd., Suwon-Si, Gyeonggi-Do (KR)

(72) Inventors: Soon-Jae Kwon, Yongin-Si (KR); Numazawa Takenori, Tsukuba (JP)

(73) Assignees: Samsung Electronics Co., Ltd., Gyeonggi-do (KR); National Institute for Materials Science, Ibaraki (JP)

( * ) Notice: Subject to any disclaimer, the term of this patent is extended or adjusted under 35 U.S.C. 154(b) by 107 days.

(21) Appl. No.: 14/565,000

(22) Filed: Dec. 9, 2014

(65) Prior Publication Data

US 2015/0211771 A1    Jul. 30, 2015

(30) Foreign Application Priority Data

Jan. 28, 2014   (KR) .................. 10-2014-0010796

(51) Int. Cl.
*F25B 21/00* (2006.01)
*H01F 1/01* (2006.01)

(52) U.S. Cl.
CPC ............ *F25B 21/00* (2013.01); *H01F 1/012* (2013.01); *F25B 2321/00* (2013.01); *Y02B 30/66* (2013.01)

(58) Field of Classification Search
CPC ............ F25B 2321/002; F25B 2321/00; F25B 21/00; H01F 1/012; H01F 1/015; H01F 1/017; Y02B 30/66

(Continued)

(56) References Cited

U.S. PATENT DOCUMENTS 4,829,770 A    5/1989   Hashimoto
5,040,373 A    8/1991   Minovitch
(Continued)

FOREIGN PATENT DOCUMENTS

JP        60-204852        10/1985
JP        02-103348        8/1990
(Continued)

OTHER PUBLICATIONS

Japanese Office Action dated Nov. 28, 2017 in related Japanese Application No. 2015-001871.

*Primary Examiner* — Frantz Jules
*Assistant Examiner* — Joseph Trpisovsky
(74) *Attorney, Agent, or Firm* — Harness, Dickey & Pierce, P.L.C.

(57) ABSTRACT

A magnetic refrigerator, and a device including the same, include a hot-end heat exchanger, a cold-end heat exchanger, a magnetic material arranged so as to provide a temperature gradient between the hot-end heat exchanger and the cold-end heat exchanger, and a heat exchange medium, and satisfying the following Equation 1.

$k = T_h/T_c = \Delta S_c/\Delta S_h > 1$     Equation 1

In Equation 1, $T_h$ is a temperature of a hot-end heat exchanger, $T_c$ is a temperature of a cold-end heat exchanger, $\Delta S_h$ is an entropy change of a magnetic material at $T_h$, and $\Delta S_c$ is an entropy change of a magnetic material at $T_c$.

10 Claims, 2 Drawing Sheets

(58) Field of Classification Search
USPC .......................................................... 62/3.1
See application file for complete search history.

(56) References Cited

U.S. PATENT DOCUMENTS

| | | |
|---|---|---|
| 5,124,215 A | 6/1992 | Hashimoto |
| 7,114,340 B2 | 10/2006 | Pecharsky et al. |
| 7,404,295 B2 | 7/2008 | Li et al. |
| 7,552,592 B2 | 6/2009 | Iwasaki et al. |
| 8,424,314 B2 | 4/2013 | Mazet |
| 2010/0058775 A1* | 3/2010 | Kaji ...................... F25B 21/00 62/3.1 |
| 2010/0107654 A1 | 5/2010 | Rowe et al. |
| 2010/0276627 A1* | 11/2010 | Mazet ................... H01F 1/017 252/62.55 |
| 2011/0049413 A1 | 3/2011 | Mazet |
| 2012/0043497 A1 | 2/2012 | Katter et al. |
| 2012/0045633 A1* | 2/2012 | Katter ................... H01F 1/015 428/218 |
| 2013/0247588 A1 | 9/2013 | Mla et al. |
| 2014/0007592 A1* | 1/2014 | Binek ................... F25B 21/00 62/3.1 |

FOREIGN PATENT DOCUMENTS

| | | |
|---|---|---|
| JP | 06-0509635 | 10/1994 |
| JP | 09-33130 | 2/1997 |
| JP | 2007147209 A | 6/2007 |
| JP | 61-235655 | 3/2010 |
| JP | 2010-060211 A | 3/2010 |
| JP | 2011-520030 A | 7/2011 |
| KR | 20120022553 A | 3/2012 |
| KR | 20130108765 A | 10/2013 |

\* cited by examiner

[FIG. 1]
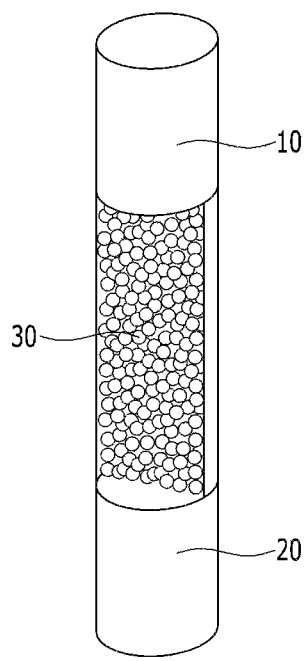

[FIG. 2]
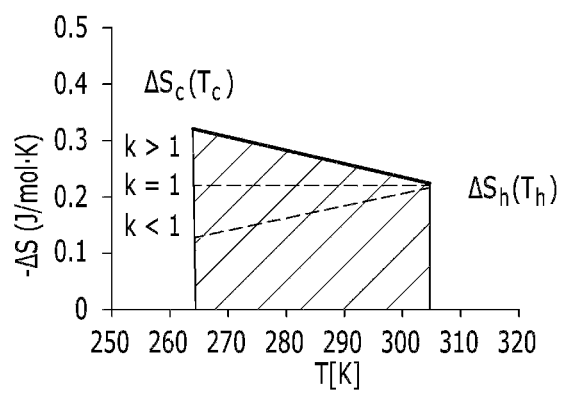
[FIG. 3]
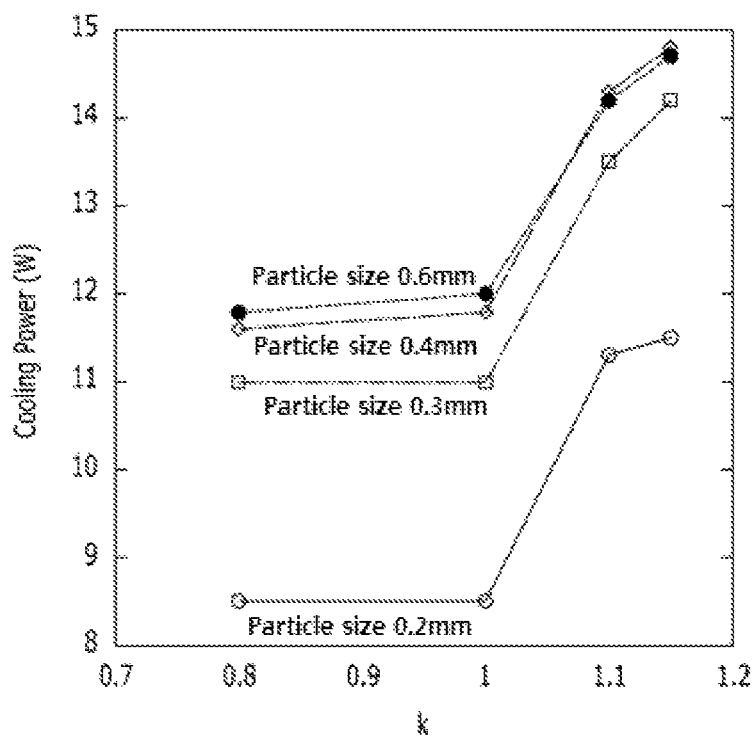

MAGNETIC REFRIGERATOR AND DEVICE INCLUDING THE SAME

This application claims priority under 35 U.S.C. § 119 to Korean Patent Application No. 10-2014-0010796 filed in the Korean Intellectual Property Office on Jan. 28, 2014, the entire contents of which are incorporated herein by reference.

BACKGROUND

1. Field

Example embodiments relate to a magnetic refrigerator and/or a device including the same.

2. Description of the Related Art

A cooling device such as a refrigerator or a freezer is a device for lowering a temperature by repeating cooling cycles of compressing-condensing-expanding-evaporating a coolant, which is performed by increasing a temperature and a pressure of a gas coolant having a low temperature and a low pressure, condensing the coolant having a high temperature and a high pressure by the outside atmosphere, depressurizing the condensed coolant, and evaporating the depressurized coolant under the low pressure to absorb heat. These cooling devices have limits from an environmental viewpoint because the cooling devices use a gas coolant imparting huge greenhouse effects.

Accordingly, research is actively performed to exclude gas coolants so as to provide an environmentally-friendly and also highly efficient cooling device. One of these approaches involves a magnetic refrigerator having a magnetic material and a permanent magnet.

The magnetic refrigerator is cooled using magnetocaloric effects, which involves heating or cooling by changing a spin arrangement of a magnetic material according to a magnetic field. Cooling using magnetocaloric effects has drawn attention as a new cooling method for accomplishing the environmentally-friendly, quiet, and highly efficient performance.

An active magnetic regenerator is one kind of the magnetic refrigerator, and research on applying the active magnetic regenerator at room temperature has been performed.

SUMMARY

Example embodiments provide a magnetic refrigerator with improved efficiency and enhanced cooling power.

Other example embodiments provide a device including the magnetic refrigerator.

According to example embodiments, provided is a magnetic refrigerator including a hot-end heat exchanger, a cold-end heat exchanger, a magnetic material arranged so as to provide a temperature gradient between the hot-end heat exchanger and the cold-end heat exchanger, and a heat-exchange medium, and satisfying the following Relationship Equation 1.

$$k = Th/Tc = \Delta Sc/\Delta Sh > 1 \quad \text{Relationship Equation 1}$$

In Relationship Equation 1, Th is a temperature of a hot-end heat exchanger, Tc is a temperature of a cold-end heat exchanger, $\Delta Sh$ is an entropy change of a magnetic material at Th, and $\Delta S_c$ is an entropy change of a magnetic material at $T_c$.

The magnetic material may include at least one selected from the group consisting of a metal, a semi-metal, an alloy thereof, an oxide thereof, and a combination thereof.

The magnetic material may include at least one selected from iron (Fe), manganese (Mn), cobalt (Co), nickel (Ni), niobium (Nb), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), boron (B), silicon (Si), germanium (Ge), gallium (Ga), arsenic (As), antimony (Sb), tellurium (Te), phosphorus (P), arsenic (As), antimony (Sb), and bismuth (Bi), an alloy thereof, an oxide thereof, a nitride thereof, and a combination thereof.

The magnetic material may be in the form of a particle.

The magnetic material may change volume or mass between the hot-end heat exchanger and the cold-end heat exchanger to control an entropy change of Relationship Equation 1.

The entropy change of the magnetic material may linearly change between the hot-end heat exchanger and the cold-end heat exchanger.

The entropy change of the magnetic material may linearly decrease from the cold-end heat exchanger to the hot-end heat exchanger.

The magnetic material may include at least two materials having different magnetic phase transition temperatures than each other.

The magnetic refrigerator may satisfy the following expression: $1 < k \leq 1.2$.

The magnetic refrigerator may satisfy the following expression: $1 < k \leq 1.15$.

According to further example embodiments, a device including the magnetic refrigerator is provided.

BRIEF DESCRIPTION OF THE DRAWINGS

Example embodiments will be more clearly understood from the following detailed description taken in conjunction with the accompanying drawings. FIGS. 1-3 represent non-limiting, example embodiments as described herein.

FIG. 1 is a schematic view showing a magnetic refrigerator according to example embodiments.

FIG. 2 is a graph showing an entropy change with respect to a parameter k.

FIG. 3 is a graph showing cooling power according to parameter k of magnetic refrigerators obtained from Examples 1 to 4.

DETAILED DESCRIPTION

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

Hereinafter, the magnetic refrigerator according to example embodiments is described with reference to FIG. 1.

FIG. 1 is a schematic view showing a magnetic refrigerator according to example embodiments.

Referring to FIG. 1, the magnetic refrigerator according to example embodiments includes a hot-end heat exchanger 10, a cold-end heat exchanger 20, a magnetic material 30 providing a temperature gradient between the hot-end heat exchanger 10 and the cold-end heat exchanger 20, and a heat-exchange medium (not shown).

The magnetic material 30 may be arranged to form a heat conducting path extending from the hot-end heat exchanger 10 to the cold-end heat exchanger 20 such that the temperature gradient gradually varies along the heat conducting path, and the magnetic material is in thermal communication with the hot-end heat exchanger 10 and the cold-end heat exchanger 20. The magnetic material 30 may be arranged to fill an entire area between the hot-end heat exchanger 10 and the cold-end heat exchanger 20, or a portion of the area between the hot-end heat exchanger 10 and the cold-end heat exchanger 20 while retaining the heat conducting path extending from the hot-end heat exchanger 10 to the cold-end heat exchanger 20.

The magnetic refrigerator may be an active magnetic regenerator (AMR), the magnetic material is used as a magnetocaloric material, and the heat-exchange medium may transfer heat while shuttling in the magnetic refrigerator. The heat of the magnetocaloric material due to the magnetic entropy is changed by applying the external magnetic field, thus a temperature difference may occur between the hot-end heat exchanger 10 and the cold-end heat exchanger 20. The external magnetic field may be applied by using, for example, a superconductive magnetic, an electromagnetic, solenoid or a permanent magnet, and it may be, for example, a permanent magnet. The permanent magnet may magnetize or demagnetize the magnetic material 30 through a relative reciprocation motion with the magnetic material 30.

The magnetic material 30 may include any magnetocaloric material as long as it imparts magnetocaloric effects occurring by the magnetic phase transition, for example, a metal, a semi-metal, an alloy thereof, an oxide thereof, or a combination thereof. The magnetic material 30 may include, for example, at least one selected from iron (Fe), manganese (Mn), cobalt (Co), nickel (Ni), niobium (Nb), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), boron (B), silicon (Si), germanium (Ge), gallium (Ga), arsenic (As), antimony (Sb), tellurium (Te), phosphorus (P), arsenic (As), antimony (Sb), and bismuth (Bi), an alloy thereof, an oxide thereof, a nitride thereof, or a combination thereof.

The magnetic material may consist of metals, metal oxides, ferrites or a mixture thereof.

The magnetic material may be a non-corrosive material, for example, a ceramic.

The magnetic material 30 may have a magnetic phase transition temperature around room temperature (about 300 K). The magnetic phase transition temperature refers to a temperature at a point of transferring the magnetocaloric material from a ferromagnetic state into a paramagnetic state. The magnetocaloric material may be present in a ferromagnetic state at a lower temperature than the magnetic phase transition temperature, and may be transferred to a paramagnetic state at a higher temperature than the magnetic phase transition temperature. Accordingly, the magnetocaloric material may be usefully applied to a cooling device such as a refrigerator or an air conditioner by having a magnetic phase transition temperature around room temperature.

The magnetic material 30 may be included in a particle, and the particle may be, for example, a microcrystalline particle.

The magnetic material 30 may have a particle diameter of about 1 nm to about 1000 μm. When having the particle diameter within the range, crack generation due to the magnetic hysteresis and thermal hysteresis may be prevented or compensated, so the magnetic cooling efficiency and the life-span characteristics may be improved. Within the range, the particle diameter may range from about 10 nm to about 700 μm, and for example, the particle diameter may range from about 100 nm to about 600 μm.

The magnetic material 30 may include at least two particles having different particle diameters, and in this case, the particle diameter deviation may be less than or equal to about 30 μm, for example, about 5 nm to about 30 μm. When having the particle diameter deviation within the range, the crack generation due to the magnetic hysteresis and thermal hysteresis may be prevented or compensated, so the magnetic cooling efficiency and the life-span characteristics may be improved. Within the range, the particle diameter deviation may range from about 20 nm to about 20 μm, for example, the particle diameter deviation may range from about 100 nm to about 10 μm.

The heat-exchange medium may be, for example, water, ethylene glycol, or a combination thereof, but is not limited thereto.

The magnetic refrigerator may configure the magnetic material 30 to satisfy the following Relationship Equation 1.

$$k=T_h/T_c=\Delta S_c/\Delta S_h>1 \qquad \text{RELATIONSHIP EQUATION 1}$$

In Relationship Equation 1, $T_h$ is a temperature of a hot-end heat exchanger, $T_c$ is a temperature of a cold-end heat exchanger, $\Delta S_h$ is an entropy change of a magnetic material at $T_h$, and $\Delta S_c$ is an entropy change of a magnetic material at $T_c$.

Relationship Equation 1 may determine the relationship between the highest temperature of the magnetic refrigerator, which is the temperature of the hot-end heat exchanger, and the lowest temperature of the magnetic refrigerator, which is the temperature of the cold-end heat exchanger, and the entropy change of a magnetic material at the temperatures, so as to find the method of improving the efficiency of the magnetic refrigerator.

Theoretically, the heat Q in the magnetic refrigerator and the work W from the outside may be represented by the following Relationship Equation 2.

$$Q_h=Q_c+W \qquad \text{RELATIONSHIP EQUATION 2}$$

In Relationship Equation 2, $Q_h$ refers to heat in the hot-end heat exchanger, $Q_c$ refers to heat in the cold-end heat exchanger, and W refers to work from the outside.

Herein, $Q_h$ and $Q_c$ may each be defined by the following Relationship Equations 2-1 and 2-2.

$$Q_h=T_h\times\Delta S_h \qquad \text{RELATIONSHIP EQUATION 2-1}$$

$$Q_c=T_c\times\Delta S_c \qquad \text{RELATIONSHIP EQUATION 2-2}$$

In Relationship Equations 2-1 and 2-2, $Q_h$ is heat at the hot-end heat exchanger, $Q_c$ is heat at the cold-end heat exchanger, $T_h$ is a temperature of a hot-end heat exchanger, $\Delta S_h$ is an entropy change of a magnetic material at $T_h$, $T_c$ is a temperature of a cold-end heat exchanger, and $\Delta S_c$ is an entropy change of a magnetic material at $T_c$.

In Relationship Equations 2, 2-1, and 2-2, considering the case that a cycle is completed at 1 cycle without providing work from the outside, it may be assumed that W=0. W=0 may be assumed to be the case that the outside work is minimized, and the efficiency is maximized.

In this case, Relationship Equations 2, 2-1, and 2-2 may satisfy the following Relationship Equation 3, thus the following Relationship Equation 4 may be established.

$$T_h\times\Delta S_h=T_c\times\Delta S_c \qquad \text{RELATIONSHIP EQUATION 3}$$

$$k=T_H/T_c=\Delta S_c/\Delta S_h \qquad \text{RELATIONSHIP EQUATION 4}$$

When Relationship Equation 4 is defined with a parameter k, k may be defined as a ratio of the magnetic material entropy change of the hot-end heat exchanger 10 and the cold-end heat exchanger 20, or a ratio of the temperature of the cold-end heat exchanger 20 and the temperature of the hot-end heat exchanger 10.

The magnetic refrigerator may include other components (not shown) known in the art, for example, cylinders configured to contain the magnetic material 30, sealing members, plates, pipes or passages, valves, pistons etc.

FIG. 2 is a graph showing an entropy change with respect to the parameter k.

As shown in FIG. 2, the entropy change may be linearly changed according to the temperature when k>1 as in Relationship Equation 1, specifically, the entropy change from the cold-end heat exchanger 20 to the hot-end heat exchanger 10 may be linearly decreased.

As the cooling power of magnetic refrigerator depends upon the k value, the cooling power of the magnetic refrigerator may be significantly improved when k>1. Accordingly, to satisfy k>1, the entropy change of the magnetic material 30 may be controlled between the hot-end heat exchanger 10 and the cold-end heat exchanger 20. For example, the entropy change may be controlled by changing the volume or mass of the magnetic material 30 between the hot-end heat exchanger 10 and the cold-end heat exchanger 20.

Within the range, 1<k≤1.2 may be satisfied; within the range, 1<k≤1.15 may be satisfied; and within the range, k may be about 1.15.

As shown above, as the disposition of the magnetic material 30 is determined based on the entropy change of the magnetic material 30, the heat in the magnetic refrigerator may be uniformly controlled so as to improve the efficiency.

Generally, the entropy change (ΔS) of a magnetic material has a peak around the magnetic phase transition temperature, and tends to be decreased going to other temperatures. Thereby, the heat Q=T×ΔS, which is generated according to the entropy change (ΔS), may not be uniform depending upon the temperature in the magnetic refrigerator, and the non-uniform calorie count may generate heat loss in the magnetic refrigerator to deteriorate efficiency. According to example embodiments, the efficiency deterioration of the magnetic refrigerator may be prevented and the efficiency may be enhanced because entropy change of the magnetic material for providing the highest efficiency is determined, and the magnetic material is disposed according to the same.

The magnetic material 30 may include at least two kinds of materials having different magnetic phase transition temperatures. Thus, the temperature range for providing cooling effect may be extended, so the operation temperature range may be widened.

The magnetic refrigerator may be applied to various devices requiring magnetocaloric effects, for example, a magnetic cooling device, a magnetic heat generator, and a magnetic heat pump, but is not limited thereto.

The following examples illustrate the present disclosure. However, it is understood that these examples are not limited.

EXAMPLES

Example 1

The magnetic refrigerator is set under the conditions of Table 1, and a cycle simulation is performed.

TABLE 1

| Parameter | Value/Spec | Parameter | Value/Spec |
|---|---|---|---|
| Magnetic Material | 0.16 kg/Gd | Magnetic Field | 1T |
| Heat Exchange Fluid | Antifreeze Water | Cycle Frequency | 1 Hz |
| $T_{hot}$ | 307 K | $T_{cold}$ | 267 K |
| Regenerator Size | 20.3 cm³ | Porosity | 0.356 |
| Aspect Ratio | 7.66 | | |

A Gd magnetic material having a particle diameter of 0.2 mm is used as the magnetic material, and the magnetic material is stacked according to the temperature gradient in the magnetic refrigerator to satisfy Relationship Equation 1.

Example 2

The magnetic refrigerator is set in accordance with the same method as in Example 1 and the cycle simulation is carried out, except that the Gd magnetic material has a particle diameter of 0.3 mm.

Example 3

The magnetic refrigerator is set in accordance with the same method as in Example 1 and the cycle simulation is carried out, except that the Gd magnetic material has a particle diameter of 0.4 mm.

Example 4

The magnetic refrigerator is set in accordance with the same method as in Example 1 and the cycle simulation is carried out, except that the Gd magnetic material has a particle diameter of 0.6 mm.

Evaluation

FIG. 3 is a graph showing cooling power according to parameter k of the magnetic refrigerators obtained from Examples 1 to 4.

Referring to FIG. 3, it is confirmed that the cooling power is sharply increased when k>1, regardless of the particle diameter. Specifically, it is confirmed that the cooling power is significantly improved in the case of k>1 compared to the case of k=1, and it is confirmed that the case of k=about 1.15 improves the cooling power by about 20%.

From the results, when the magnetic material is disposed to provide the magnetic refrigerator with an entropy change having the optimal efficiency, the cooling power may be improved without enlarging the size of the magnetic refrigerator and increasing the content of the magnetic material, so the small and light magnetic refrigerator may be accomplished.

The foregoing is illustrative of example embodiments and is not to be construed as limiting thereof. Although a few example embodiments have been described, those skilled in the art will readily appreciate that many modifications are possible in example embodiments without materially departing from the novel teachings. Accordingly, all such modifications are intended to be included within the scope of the disclosure as defined in the claims. In the claims, means-plus-function clauses are intended to cover the structures described herein as performing the recited function, and not only structural equivalents but also equivalent structures. Therefore, it is to be understood that the foregoing is illustrative of various example embodiments and is not to be construed as limited to the specific embodiments disclosed, and that modifications to the disclosed embodiments, as well as other embodiments, are intended to be included within the scope of the appended claims.

What is claimed is:

1. A magnetic refrigerator, comprising:
a hot-end heat exchanger;
a cold-end heat exchanger;
a magnetic material arranged so as to provide a temperature gradient between the hot-end heat exchanger and the cold-end heat exchanger by an external magnetic field, the magnetic material including one of iron (Fe), manganese (Mn), cobalt (Co), nickel (Ni), niobium (Nb), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), boron (B), silicon (Si), germanium (Ge), gallium (Ga), arsenic (As), antimony (Sb), tellurium (Te), phosphorus (P), arsenic (As), antimony (Sb), and bismuth (Bi), an alloy thereof, an oxide thereof, a nitride thereof, and a combination thereof;
a heat exchange medium, and
satisfying the following Equation 1, $$1.1 \leq k = Th/Tc = \Delta Sc/\Delta Sh \leq 1.15$$

wherein, in Equation 1,
$T_h$ is a temperature of a hot-end heat exchanger,
$T_c$ is a temperature of a cold-end heat exchanger,
$\Delta S_h$ is an entropy change of the magnetic material at $T_h$, and
$\Delta S_c$ is an entropy change of the magnetic material at $T_c$.

2. The magnetic refrigerator of claim 1, wherein the magnetic material is in the form of a particle.

3. The magnetic refrigerator of claim 1, wherein the magnetic material controls an entropy change of Equation 1 by changing volume or mass between the hot-end heat exchanger and the cold-end heat exchanger.

4. The magnetic refrigerator of claim 1, wherein the magnetic material has an entropy change linearly changing between the hot-end heat exchanger and the cold-end heat exchanger.

5. The magnetic refrigerator of claim 1, wherein the magnetic material has an entropy change linearly decreasing from the cold-end heat exchanger to the hot-end heat exchanger.

6. The magnetic refrigerator of claim 1, wherein the magnetic material includes at least two materials having different magnetic phase transition temperatures than each other.

7. A device, comprising:
   the magnetic refrigerator according to claim 1.

8. The magnetic refrigerator of claim 1, wherein the external magnetic field is applied by using a superconductive magnetic, an electromagnetic, solenoid or a permanent magnet.

9. The magnetic refrigerator of claim 1, wherein the heat exchange medium is water, ethylene glycol or a combination thereof.

10. The magnetic refrigerator of claim 1, further comprising:
    a magnetic structure including a superconductive magnetic, an electromagnetic, solenoid or a permanent magnet, wherein
    the magnetic structure is configured to apply the external magnetic field to the magnetic material.

* * * * *